(12) United States Patent
Takaba

(10) Patent No.: US 11,983,445 B2
(45) Date of Patent: May 14, 2024

(54) INFORMATION PROCESSING APPARATUS, CONTROL METHOD, AND STORAGE MEDIUM STORING PROGRAM

(71) Applicant: CANON KABUSHIKI KAISHA, Tokyo (JP)

(72) Inventor: Ryo Takaba, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 17 days.

(21) Appl. No.: 17/724,703

(22) Filed: Apr. 20, 2022

(65) Prior Publication Data
US 2022/0342612 A1    Oct. 27, 2022

(30) Foreign Application Priority Data

Apr. 23, 2021 (JP) ................................ 2021-073657

(51) Int. Cl.
*G06F 3/048* (2013.01)
*G06F 3/0484* (2022.01)
*G06F 3/12* (2006.01)

(52) U.S. Cl.
CPC .......... *G06F 3/1203* (2013.01); *G06F 3/0484* (2013.01); *G06F 3/1229* (2013.01); *G06F 3/1292* (2013.01)

(58) Field of Classification Search
CPC .... G06F 3/0484; G06F 3/1203; G06F 3/1229; G06F 3/1292
See application file for complete search history.

(56) References Cited

U.S. PATENT DOCUMENTS

| | | | |
|---|---|---|---|
| 9,015,586 B2* | 4/2015 | Takemura | G06F 9/453 715/705 |
| 2006/0095924 A1* | 5/2006 | Inoue | G06F 9/4411 719/327 |
| 2006/0158686 A1* | 7/2006 | Watanabe | H04N 1/00962 358/1.15 |

(Continued)

FOREIGN PATENT DOCUMENTS

| | | | | |
|---|---|---|---|---|
| JP | 2000003262 A | | 1/2000 | |
| JP | 2009163760 A | * | 7/2009 | ............. G06F 9/453 |
| WO | 2006-080361 A | | 8/2006 | |

OTHER PUBLICATIONS

Japanese Office Action dated Mar. 3, 2023 in counterpart Japanese Patent Appln. No. 2021-073657.

*Primary Examiner* — Linh K Pham
(74) *Attorney, Agent, or Firm* — Venable LLP

(57) ABSTRACT

An information processing apparatus performs setup processing of a first apparatus connected to the information processing apparatus; acquires setup data used in the setup processing and indicating a setup operation of the first apparatus from a second apparatus different from the first apparatus; determines whether display concerning the setup operation can be performed using the acquired setup data; and, if it is determined that the display concerning the setup operation can be performed, the display concerning the setup operation is performed by predetermined program, if it is determined that the display concerning the setup operation cannot be performed, predetermined processing for allowing a user to refer to other medium except for the predetermined program is performed. The other medium is for presenting information concerning the setup operation.

20 Claims, 8 Drawing Sheets

(56) References Cited

U.S. PATENT DOCUMENTS

| | | | | |
|---|---|---|---|---|
| 2007/0229891 | A1* | 10/2007 | Yanagi | H04L 67/52 358/1.15 |
| 2009/0019500 | A1* | 1/2009 | Tanaka | H04N 21/235 725/100 |
| 2010/0107157 | A1* | 4/2010 | Seo | G06F 9/4411 717/176 |
| 2013/0263279 | A1* | 10/2013 | Kobashi | G06F 21/10 726/26 |
| 2017/0251080 | A1* | 8/2017 | Kato | H04W 4/50 |
| 2020/0026526 | A1* | 1/2020 | Hu | G06F 8/61 |
| 2020/0042255 | A1* | 2/2020 | Kawaura | H04N 1/00037 |
| 2020/0382679 | A1* | 12/2020 | Ogura | H04N 1/4413 |

* cited by examiner

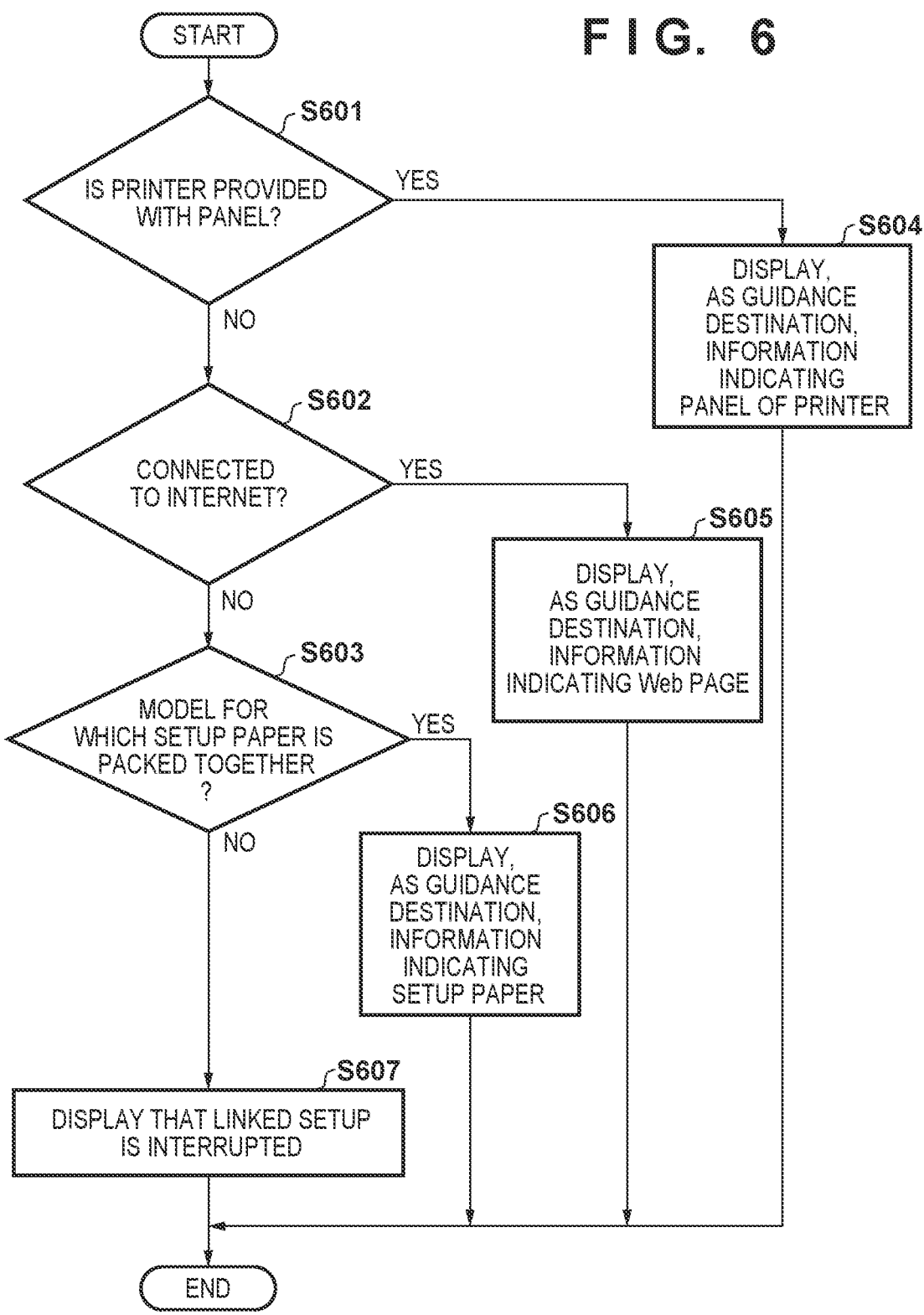

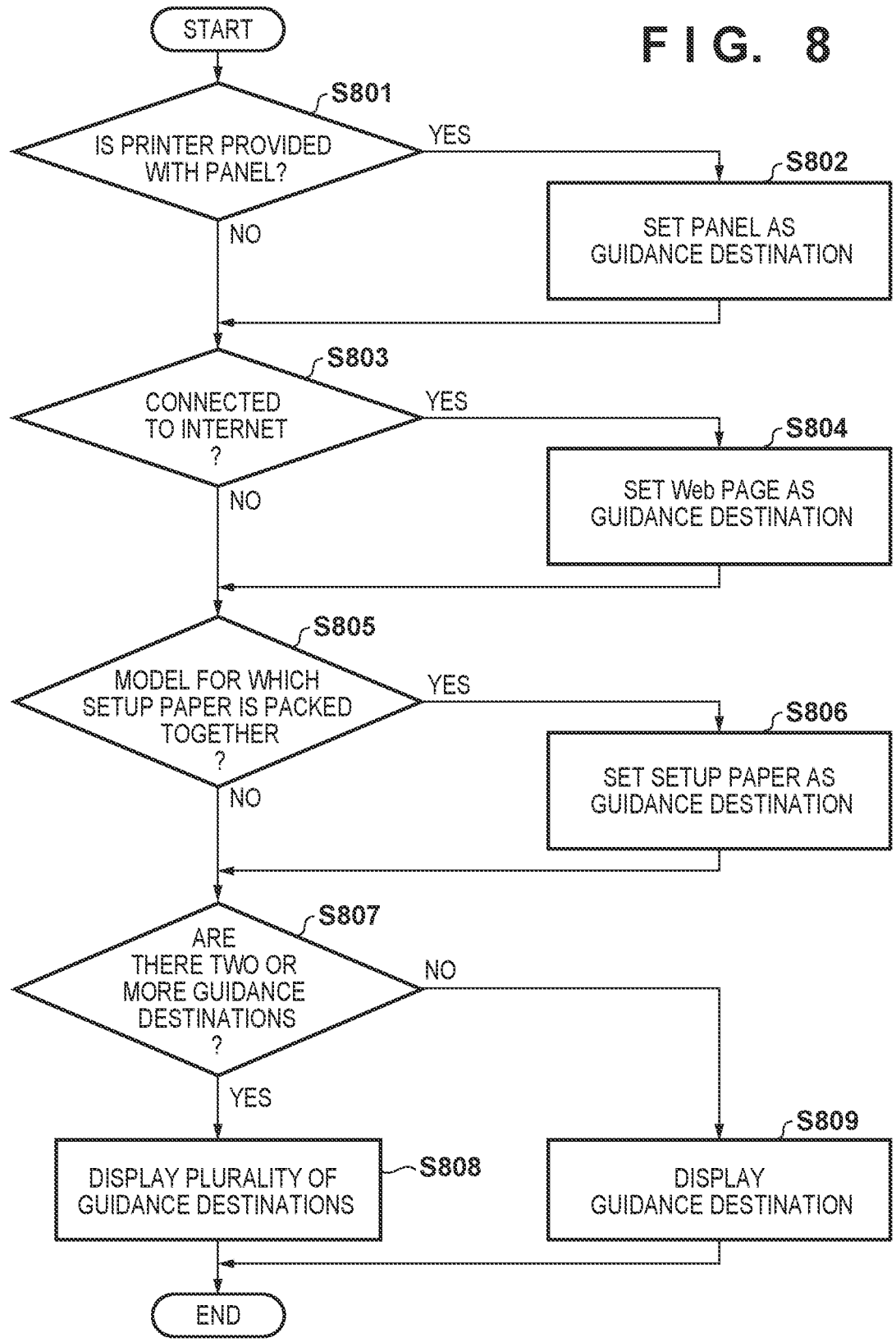

INFORMATION PROCESSING APPARATUS, CONTROL METHOD, AND STORAGE MEDIUM STORING PROGRAM

BACKGROUND OF THE INVENTION

Field of the Invention

The present invention relates to an information processing apparatus capable of executing setup processing, a control method, and a storage medium storing a program.

Description of the Related Art

To allow a user to use a printer, after unpacking, a main body installation operation such as a work for stripping off a fixing tape and a work for attaching ink needs to be performed. As a method of explaining the procedure of the main body installation operation to the user, instruction paper bundled with the printer or a web page is sometimes used. Japanese Patent Laid-Open No. 2000-3262 describes a configuration that, when performing the main body installation operation, makes an explanation of the main body installation operation on a setup application by cooperation of a printer and the setup application executed on a PC or a smartphone.

On the other hand, as the commonality of setup applications between models increases, the main body installation operations for printers of a plurality of models can be performed using one setup application.

SUMMARY OF THE INVENTION

The present invention provides an information processing apparatus which, if a setup operation cannot be presented by setup data, displays information of an alternative medium capable of presenting the setup operation, a control method, and a program.

The present invention in its first aspect provides a control method of information processing apparatus comprising: performing setup processing of a first apparatus connected to the information processing apparatus; acquiring setup data used in the setup processing and indicating a setup operation of the first apparatus from a second apparatus different from the first apparatus; determining whether display concerning the setup operation can be performed using the acquired setup data; and if it is determined that the display concerning the setup operation can be performed, performing the display concerning the setup operation by predetermined program, if it is determined that the display concerning the setup operation cannot be performed, performing predetermined processing for allowing a user to refer to other medium except for the predetermined program, the other medium being for presenting information concerning the setup operation.

The present invention in its second aspect provides an information processing apparatus comprising: a setup unit configured to perform setup processing of a first apparatus connected to the information processing apparatus; an acquisition unit configured to acquire setup data used in the setup processing and indicating a setup operation of the first apparatus from a second apparatus different from the first apparatus; a determination unit configured to determine whether display concerning the setup operation can be performed using the setup data acquired by the acquisition unit; and if it is determined by the determination unit that the display concerning the setup operation can be performed, the display concerning the setup operation is performed by predetermined program, if it is determined by the determination unit that the display concerning the setup operation cannot be performed, predetermined processing for allowing a user to refer to other medium except for the predetermined program is performed, the other medium being for presenting information concerning the setup operation.

The present invention in its third aspect provides a non-transitory computer-readable storage medium storing a program configured to cause a computer to function to: perform setup processing of a first apparatus connected to the information processing apparatus; acquire setup data used in the setup processing and indicating a setup operation of the first apparatus from a second apparatus different from the first apparatus; determine whether display concerning the setup operation can be performed using the acquired setup data; and if it is determined that the display concerning the setup operation can be performed, perform the display concerning the setup operation by predetermined program, if it is determined that the display concerning the setup operation cannot be performed, perform predetermined processing for allowing a user to refer to other medium except for the predetermined program, the other medium being for presenting information concerning the setup operation.

According to the present invention, if a setup operation cannot be presented by setup data, information of an alternative medium capable of presenting the setup operation can be displayed.

Further features of the present invention will become apparent from the following description of exemplary embodiments with reference to the attached drawings.

BRIEF DESCRIPTION OF THE DRAWINGS

FIG. 6 is a flowchart showing processing of display control of a guidance screen;

FIG. 8 is a flowchart showing processing of display control of the guidance screen.

DESCRIPTION OF THE EMBODIMENTS

Figure 1:
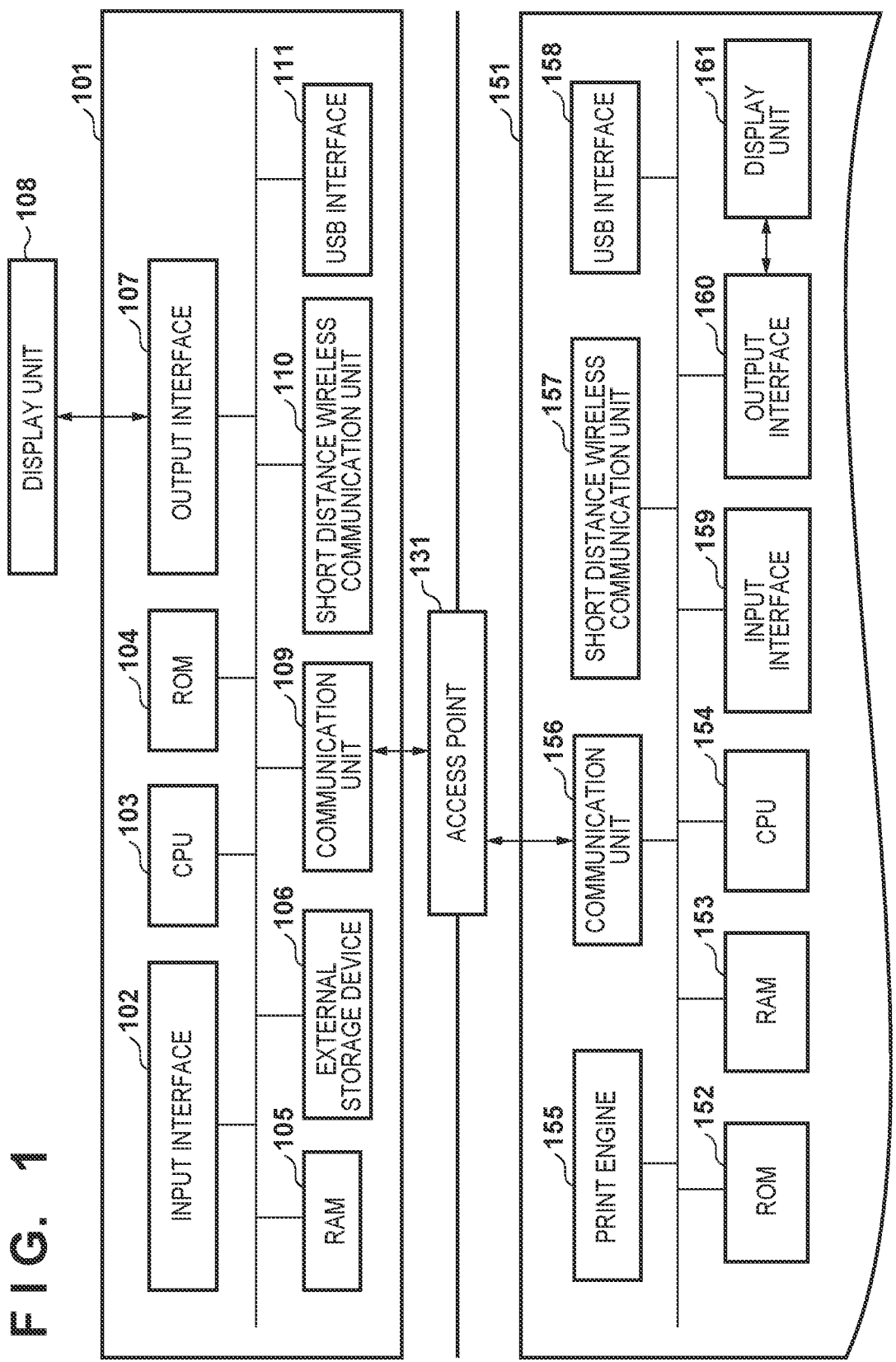
FIG. 1 is a view showing the configuration of a system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

To explain a main body installation operation that changes depending on the model, setup data corresponding to each model is needed. However, including such setup data in a setup application in advance increases the data capacity. In addition, holding setup data in a printer increases the ROM capacity of the printer, resulting in an increase in cost.

For this reason, when performing setup processing by a setup application, setup data is acquired from a server via a network. However, if the setup data cannot normally be acquired because of a network trouble or server trouble, a user cannot execute the main body installation operation by the setup data.

According to this embodiment, if a setup operation cannot be presented by setup data, information of an alternative medium capable of presenting the setup operation can be displayed.

First Embodiment

FIG. 1 shows an example of the configuration of a system including an information processing apparatus 101, and a printing apparatus 151 capable of communicating with the information processing apparatus 101. As the information processing apparatus 101 included in the system according to this embodiment, for example, a PC or a smartphone serving as a portable terminal is used. However, the functions are not limited to those shown in FIG. 1 if the apparatus is applicable as an apparatus capable of communicating with the printing apparatus 151. In addition, for example, a printer is used as the printing apparatus 151. However, the apparatus is not limited to a printer, and various apparatuses can be adopted if the apparatuses are applicable as apparatuses capable of communicating with the information processing apparatus 101. For example, concerning a printer, the present disclosure can be applied to an inkjet printer, a full-color laser beam printer, a monochrome printer, and the like. The present disclosure can be applied not only to a printer but also to a copying machine, a facsimile apparatus, a portable terminal, a smartphone, a laptop, a tablet terminal, a PDA (Personal Digital Assistant), a digital camera, a music playback device, a television, and the like. The present disclosure can also be applied to a multi-function peripheral having a plurality of functions such as a copying function, a FAX function, and a print function.

The information processing apparatus 101 includes an input interface 102, a CPU 103, a ROM 104, a RAM 105, an external storage device 106, an output interface 107, a display unit 108, a communication unit 109, a short distance wireless communication unit 110, and a USB interface 111. The input interface 102 is an interface configured to accept data input and operation instructions from the user, and is formed by a physical keyboard, buttons, a touch panel, and the like. Note that the output interface 107 to be described later and the input interface 102 may have the same configuration, and output of a screen and acceptance of an operation from the user may be done by the same configuration.

The CPU 103 is a system control unit and comprehensively controls the whole information processing apparatus 101. The ROM 104 stores permanent data such as control programs to be executed by the CPU 103, data tables, and an embedded operating system (to be referred to as an OS hereinafter) program. In this embodiment, the control programs stored in the ROM 104 perform software execution control such as scheduling, task switch, and interrupt processing under the management of the embedded OS stored in the ROM 104.

The RAM 105 is formed by an SRAM (Static Random Access Memory) or the like, which needs a backup power supply. Note that the RAM 105 can store important data such as program control variables without volatilization because the data is held by a primary battery (not shown) for data backup. In addition, a memory area for storing setting information of the information processing apparatus 101, management data of the information processing apparatus 101, and the like is also provided in the RAM 105. Also, the RAM 105 is sometimes used as the main memory and the work memory of the CPU 103.

The external storage device 106 stores a setup application configured to perform setup processing of the printing apparatus 151, an application that provides a print execution function, a print information generation program that generates print information interpretable by the printing apparatus 151, and the like. These applications and programs are sometimes downloaded from an external server (not shown) different from the printing apparatus 151 and stored. Also, the external storage device 106 stores various kinds of programs such as an information transmission/reception control program to be transmitted/received to/from the printing apparatus 151 connected via the communication unit 109, and various kinds of information to be used by the programs.

The output interface 107 is an interface configured to perform control for causing the display unit 108 to display data or notify the user of the state of the information processing apparatus 101. The display unit 108 is formed by an LED (Light-Emitting Diode), an LCD (Liquid Crystal Display), or the like and displays data or makes a notification concerning the state of the information processing apparatus 101. Note that a soft keyboard including keys such as a numerical value input key, a mode setting key, an enter key, a cancel key, and a power key may be installed on the display unit 108 to accept an input from the user via the display unit 108. In this case, the display unit 108 plays the role of the input interface 102.

The communication unit 109 is a component connected to the printing apparatus 151 to execute data communication. For example, the communication unit 109 can be connected to an access point (not shown) in the printing apparatus 151. When the communication unit 109 and the access point in the printing apparatus 151 are connected, the information processing apparatus 101 and the printing apparatus 151 can communicate with each other. Note that between the information processing apparatus 101 and the printing apparatus 151, the communication unit 109 may directly communicate with the printing apparatus 151 by wireless communication. The communication unit 109 may also perform communication via an external access point (access point 131) existing outside the information processing apparatus 101 or the printing apparatus 151. As a wireless communication method, for example, Wi-Fi (Wireless Fidelity)®, which is a communication standard based on the IEEE 802.11 series, or Bluetooth® is used. In addition, for example, a device such as a wireless LAN router is used as the access point 131. Note that the method of directly connecting the information processing apparatus 101 and the printing apparatus 151 without the intermediary of an external access point is called a direct connection method. In addition, the method of connecting the information processing apparatus 101 and the printing apparatus 151 via the external access point 131 is called an infrastructure connection method.

The short distance wireless communication unit 110 is a component wirelessly connected to the printing apparatus 151 in a short distance to execute data communication, and performs communication by a communication method different from the communication unit 109. The short distance wireless communication unit 110 can be connected to a short distance wireless communication unit 157 in the printing apparatus 151. Note that in this embodiment, it is assumed that, as the communication method of the short distance wireless communication unit 110, Bluetooth5.1 is used. Note that Bluetooth5.1 includes both Classic Bluetooth and Bluetooth Low Energy (BLE). For example, either Classic Bluetooth or BLE can be used as the communication method of the short distance wireless communication unit 110. The USB interface 111 is a component configured to execute data communication via, for example, a USB cable.

The printing apparatus 151 includes a ROM 152, a RAM 153, a CPU 154, a print engine 155, a communication unit 156, the short distance wireless communication unit 157, a USB interface 158, an input interface 159, an output interface 160, and a display unit 161.

The communication unit 156 includes, as an access point in the printing apparatus 151, an access point configured to connect the information processing apparatus 101. Note that the access point can be connected to the communication unit 109 of the information processing apparatus 101. Note that the communication unit 156 may communicate with the information processing apparatus 101 directly by wireless communication without the intermediary of the access point 131, or may communicate via the access point 131. As the communication method, for example, Wi-Fi (Wireless Fidelity)® or Bluetooth® is used. Note that in the direct communication, the Wi-Fi Direct standard may be used, or the Legacy Wi-Fi standard may be used. Also, the communication unit 156 may include hardware functioning as an access point, or may be operated as an access point by software configured to cause the unit to function as an access point.

The short distance wireless communication unit 157 is a component configured to wirelessly connect with the information processing apparatus 101 in a short distance. In this embodiment, it is assumed that Bluetooth5.1 is used as the communication method of the short distance wireless communication unit 157. For example, in this embodiment, BLE may be used as the communication method of the short distance wireless communication unit 157. The USB interface 158 is a component configured to execute data communication via, for example, a USB cable.

The RAM 153 is formed by an SRAM or the like, which needs a backup power supply. Note that the RAM 153 can store important data such as program control variables without volatilization because the data is held by a primary battery (not shown) for data backup. In addition, a memory area for storing setting information of the printing apparatus 151, management data of the printing apparatus 151, and the like is also provided in the RAM 153. Also, the RAM 153 is used as the main memory and the work memory of the CPU 154, and functions as a reception buffer configured to temporarily store print information received from the information processing apparatus 101 or the like, or stores various kinds of information. The ROM 152 stores permanent data such as control programs to be executed by the CPU 154, data tables, and an OS program. In this embodiment, the control programs stored in the ROM 152 perform software execution control such as scheduling, task switch, and interrupt processing under the management of the embedded OS stored in the ROM 152.

The CPU 154 is a system control unit and comprehensively controls the whole printing apparatus 151. Based on information stored in the RAM 153 or a print job received from the information processing apparatus 101 or the like, the print engine 155 forms an image on a print medium such as a paper sheet using printing material such as ink and outputs the print result. At this time, since the print job transmitted from the information processing apparatus 101 or the like has a large transmission data amount, and high-speed communication is required, the print job is received via the communication unit 156 capable of performing communication at a speed higher than the short distance wireless communication unit 157.

Note that a memory such as an external HDD or an SD card may be attached as an optional device to the printing apparatus 151, and information stored in the printing apparatus 151 may be stored in the memory. Also, a connection mode is set for the printing apparatus 151 by connection setting processing, and the printing apparatus 151 communicates with the information processing apparatus 101 by a connection form based on the set connection mode. In the printing apparatus 151, to perform communication by infrastructure connection (connection via the access point 131), an infrastructure connection mode is set as the connection mode. To perform communication by direct connection (connection without the intermediary of the access point 131), a direct connection mode is set as the connection mode. Note that in this embodiment, the setup application can execute, as setup processing, setting of the network environment of the printing apparatus 151. Here, the setting of the network environment is, for example, setting of the wireless network of the printing apparatus 151, and is setting for causing the printing apparatus 151 to establish connection via an access point described with reference to FIG. 1 or connection via a USB cable. In this embodiment, if the printing apparatus 151 is powered on without completing the main body installation operation, the printing apparatus 151 starts the operation in a state called a setup mode. The setup mode is processing of enabling an access point in the printing apparatus 151, which is enabled only in the setup mode. By the setup application, the information processing apparatus 101 searches for the printing apparatus 151 operating in the setup mode, and is directly connected by Wi-Fi to the printing apparatus 151 via the access point enabled by the found printing apparatus 151. By the setup application, the information processing apparatus 101 then transmits, via the Wi-Fi connection, setting information used to set the network environment of the printing apparatus 151. More specifically, the setting information is, for example, information used to connect the access point 131 or information used to cause the printing apparatus 151 to operate in the direct connection mode. If the information used to connect the access point 131 is transmitted as the setting information, the printing apparatus 151 is connected by Wi-Fi to the access point 131 and operates in the infrastructure connection mode. Note that at this time, for example, the access point 131 is an access point connected to the information processing apparatus 101 before the information processing apparatus 101 is connected to the printing apparatus 151 operating in the setup mode. After transmitting the setting information to the printing apparatus 151, the information processing apparatus 101 is connected by Wi-Fi to the access point 131 again. Accordingly, infrastructure connection is established between the information processing apparatus 101 and the printing apparatus 151. On the other hand, if the information used to cause the printing apparatus 151 to operate in the direct connection mode is transmitted as the setting information, by the setup application, the information processing apparatus 101 receives, from the printing apparatus 151, connection information used to directly connect with the printing apparatus 151. The printing apparatus 151 then starts operating in the direct connection mode. By the setup application, the information processing apparatus 101 is connected by Wi-Fi to the printing apparatus 151 using the connection information. Accordingly, direct connection is established between the information processing apparatus 101 and the printing apparatus 151. Note that a form in which communication between the information processing apparatus 101 and the printing apparatus 151 operating in the setup mode is executed by Wi-Fi has been described. However, the present invention is not limited to this form. Communication between the information processing apparatus 101 and the printing apparatus 151 operating in the setup mode may be executed via a connection by a communication method other than Wi-Fi. The communication method other than Wi-Fi is, for example, Bluetooth (Classic Bluetooth or Bluetooth Low Energy).

The input interface 159 is an interface configured to accept data input and operation instructions from the user, and is formed by a physical keyboard, buttons, a touch panel, and the like. Note that the output interface 160 and the input interface 159 may have the same configuration, and output of a screen and acceptance of an operation from the user may be done by the same configuration. The output interface 160 is an interface configured to perform control for causing the display unit 161 to display data or notify the user of the state of the printing apparatus 151. The display unit 161 is formed by a panel or the like and displays data or makes a notification concerning the state of the printing apparatus 151. Note that a soft keyboard including keys such as a numerical value input key, a mode setting key, an enter key, a cancel key, and a power key may be installed on the display unit 161 to accept an input from the user via the display unit 161. In this case, the display unit 161 plays the role of the input interface 159.

A communication method other than the above-described communication method may be used between the information processing apparatus 101 and the printing apparatus 151. For example, a communication method such as Ethernet, Centronics, or IrDA (Infrared Data Association) may be used. Also, FIG. 1 shows connection between one information processing apparatus 101 and one printing apparatus 151. However, by using the communication interface configuration of each apparatus or a network device such as a USB hub, the information processing apparatus 101 may be connected to a plurality of printing apparatuses 151, or the printing apparatus 151 may be connected to a plurality of information processing apparatuses 101.

Figure 2A:
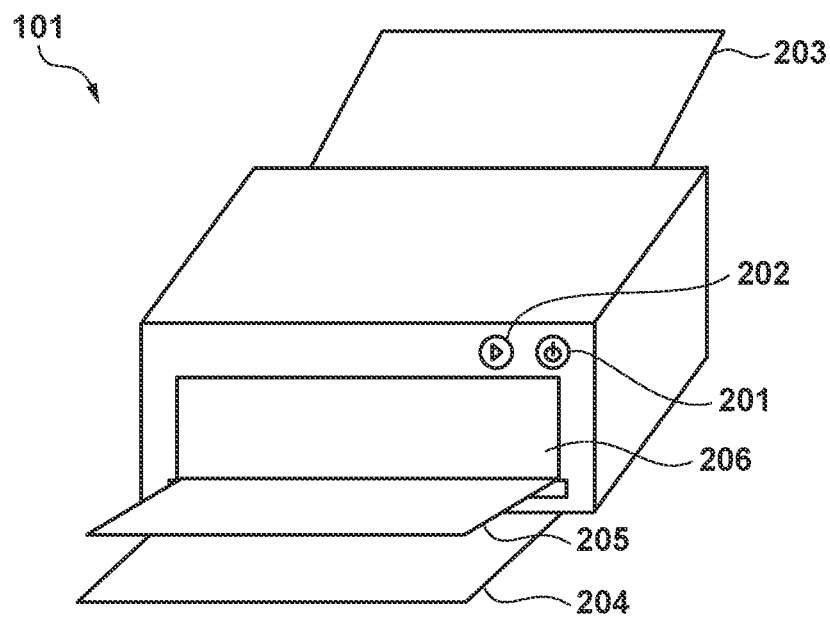
FIGS. 2A to 2C are views showing an overview of the configurations of the outer appearance of a printing apparatus.
Figure 2B:
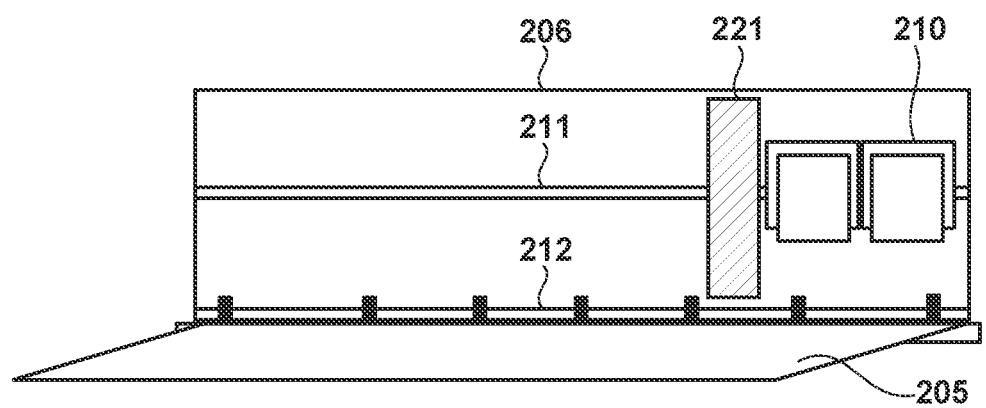
Figure 2C:
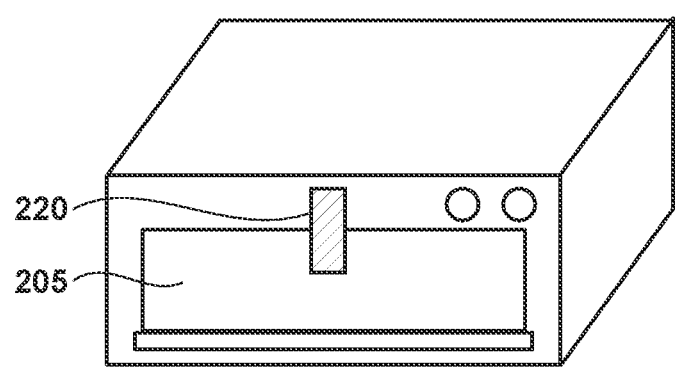

FIGS. 2A to 2C are views showing the outline of the outer appearance of the printing apparatus 151. FIG. 2A shows the outer appearance of the printing apparatus 151. The printing apparatus 151 includes a power button 201, a start button 202, a paper feed tray 203, a discharge tray 204, an access cover 205, and an opening portion 206. FIG. 2B shows the outline of the configuration in the opening portion 206 shown in FIG. 2A. The opening portion 206 shown in FIG. 2B is configured to appear when the access cover 205 is opened. An ink holder 210 is configured to hold ink tanks (ink cartridges) (not shown) and be capable of reciprocally moving along a shaft 211 in the left-and-right direction in FIG. 2B. The ink tanks store, for example, cyan, magenta, yellow, and black inks, and the color inks are discharged from nozzles of a printhead (not shown) in which the ink tanks are mounted onto a printing paper sheet. The printing paper sheet is fed by a paper feed roller 212. A fixing member 221 of the ink holder 210 is a member that fixes the ink holder 210 to prevent it from moving along the shaft 211 in the left-and-right direction to be damaged during transportation of the printing apparatus 151. FIG. 2C shows a state in which the printing apparatus 151 is taken out from the packaging box. A packing tape 220 is adhered to prevent the access cover 205 from opening to be damaged during transportation of the printing apparatus 151.

Setup processing of the printing apparatus 151 according to this embodiment will be described below. To allow the user to use the printing apparatus 151, after unpacking from the packaging box, a main body installation operation (setup operation) such as a work for stripping off the packing tape 220, a work for detaching the fixing member 221, and a work for attaching ink tanks needs to be performed. During the main body installation operation, linkage by communication is performed between the printing apparatus 151 and an application program (to be referred to as a setup application hereinafter) configured to perform the setup processing of the printing apparatus 151, which is executed by the information processing apparatus 101 such as a PC or a smartphone. For example, the information processing apparatus 101 acquires, at any time, state information representing the state of the printing apparatus 151, for example, the state as to whether the ink tanks are already attached, by the setup application in accordance with the progress of the procedure of the main body installation operation. On the setup application, the description of the procedure of the main body installation operation is displayed by at least one of a text, an image, and a moving image in accordance with the state of the printing apparatus 151 specified by the acquired state information. Setup processing according to the state of the printing apparatus 151, which is executed by the setup application when the user executes the main body installation operation, will be referred to as "linked setup processing" hereinafter.

The setup application configured to perform setup processing of the printing apparatus 151 corresponds to the printing apparatuses 151 of a plurality of models. The descriptions of the procedures of the main body installation operations of the printing apparatuses 151 of the plurality of models can be displayed by one setup application. On the other hand, to display the description of the procedure of the main body installation operation that changes depending on the model, a plurality of setup data different between the models are necessary. However, including the plurality of setup data in the setup application in advance increases the data capacity. In addition, holding the plurality of setup data in the printing apparatus 151 increases the storage capacity, resulting in an increase in cost. For this reason, setup data to be used in linked setup processing is downloaded via a network from an external server different from the printing apparatus 151 to the information processing apparatus 101 when performing linked setup processing.

However, there is assumed a case in which download fails due to the data size of the setup data or restrictions in communication. Even if download succeeds, a case is assumed in which setup data cannot be used in the setup application because of, for example, a failure of analysis by parsing processing in the information processing apparatus 101. There is also assumed a case in which not all necessary contents are included in the downloaded setup data. If setup data corresponding to the printing apparatus 151 as the target of linked setup processing cannot be prepared in the information processing apparatus 101, the description of the procedure of the main body installation operation cannot be displayed by the setup data, and the user may be unable to perform the main body installation operation.

In this embodiment, if the description of the procedure of the main body installation operation according to the current state of the printing apparatus 151 cannot be displayed by setup data, the setup application executes another processing for presenting the description of the procedure of the main body installation operation. More specifically, the setup application displays a screen used to access a web page that displays the description of the procedure of the main body installation operation. That is, it is possible to guide the user to access the web page that displays the description of the procedure of the main body installation operation. By the configuration, the user can continuously perform the main body installation operation by referring to the web page.

Figure 4:
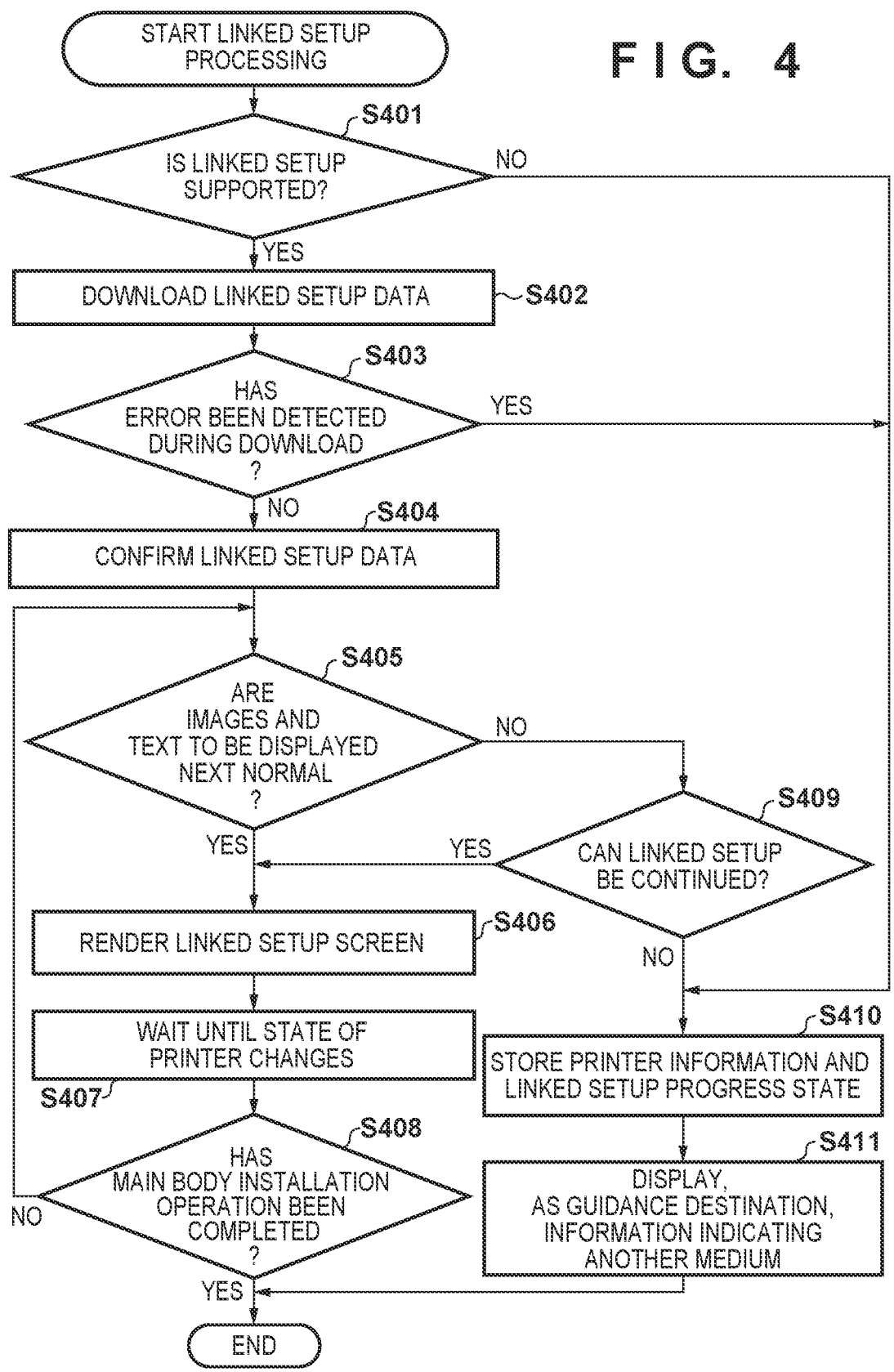
FIG. 4 is a flowchart showing linked setup processing.

FIG. 4 is a flowchart showing linked setup processing according to this embodiment. Processing shown in FIG. 4 is implemented by, for example, the CPU 103 reading out the setup application stored in the ROM 104 and executing it. Note that before the processing of this flowchart, the above-described setting of the network environment of the printing apparatus 151 is completed to enable communication between the information processing apparatus 101 and the printing apparatus 151. Before the processing of the flowchart, the information processing apparatus 101 inquires of the printing apparatus 151 about whether the main body installation operation by the user is completed. If the response from the printing apparatus 151 shows that the main body installation operation is not completed, the processing shown in FIG. 4 is started. Note that, hereafter, it is assumed that communication between the information processing apparatus 101 and the printing apparatus 151 is performed via Wi-Fi connection between the information processing apparatus 101 and the printing apparatus 151, which is established by the setting of the network environment. However, the present invention is not limited to this form, and communication between the information processing apparatus 101 and the printing apparatus 151 may be executed via connection by a communication method other than Wi-Fi. A communication method other than Wi-Fi is, for example, Bluetooth (Classic Bluetooth or Bluetooth Low Energy).

In step S401, the CPU 103 acquires information from the printing apparatus 151, and determines, based on the acquired information, whether the printing apparatus 151 supports linked setup processing. In step S401, the determination may be done based on the identification information of the printing apparatus 151 such as model information, or the determination may be done based on information received from the printing apparatus 151 and representing whether it supports linked setup processing. Upon determining in step S401 that the printing apparatus 151 supports linked setup processing, in step S402, the CPU 103 transmits the identification information of the printing apparatus 151 to an external server (not shown) that manages linked setup data. Then, download of linked setup data corresponding to the printing apparatus 151 from the server is started. The server may be, for example, a server that provides the setup application. Linked setup data is setup data corresponding to each model and used in the above-described linked setup processing. On the other hand, upon determining that the printing apparatus 151 does not support linked setup processing, the process advances to step S410. Step S410 will be described later.

In step S403, the CPU 103 determines the presence/absence of an error in the download of the linked setup data. The error is, for example, communication disconnection halfway through the download, a failure of the download, or shortage of received data. Shortage of received data is an error that occurs when the amount of actually received data is smaller than a predetermined data amount. Upon determining in step S403 that no error exists, in step S404, the CPU 103 confirms downloaded data.

Data confirmation in step S404 will be described. Linked setup data is configured to include two types of data, that is, display data to be actually displayed on a screen and instruction data used to specify the display data of the display target in accordance with the state of the printing apparatus 151. The display data is, for example, at least one of text data, image data, and moving image data. The instruction data is, for example, data representing the path information of the display data of the display target in the folder configuration of the linked setup data. The instruction data specifies the display data of the display target based on the state of the printing apparatus 151 in the linked setup processing, for example, a state representing whether the ink tanks are already attached. The instruction data may be data of a markup language format such as XML. For example, if the instruction data is data of a markup language format, after download, parsing processing for converting the data into a data structure processible by the information processing apparatus 101 is performed. As the data confirmation in step S404, display data and instruction data is confirmed by, for example, parsing processing.

After step S404, in step S405, the CPU 103 acquires the current state of the printing apparatus 151. The state of the printing apparatus 151 is the state of the printing apparatus 151 according to the progress of the main body installation operation in the linked setup processing, and is, for example, a state representing whether the ink tanks are already attached. Then, based on the current state of the printing apparatus 151 and the instruction data, the CPU 103 specifies text data, image data, or moving image data corresponding to the current state of the printing apparatus 151, and determines whether normal display is performed based on the data. For example, if text data is specified as display data, normality of display, that is, whether abnormal display is performed due to garbled characters or model-dependent characters is determined. Also, for example, if image data or moving image data is specified as display data, whether data for displaying the image or moving image to describe the main body installation operation corresponding to the current state of the printing apparatus 151 exists in the path designated by the instruction data is determined. In step S405, another determination criterion may be used. For example, whether rendering processing based on the data format or data amount is possible, the result of parsing processing in step S404, or the result of various kinds of data check may be used.

Upon determining in step S405 that normal display is performed, in step S406, the CPU 103 performs rendering processing of the specified display data, and displays, by the display unit 108, at least one of the text, the image, and the moving image for describing the main body installation operation on a screen displayed by the setup application. For example, in step S406, a moving image concerning an ink tank attaching method is displayed. On the other hand, upon determining in step S405 that normal display is not performed, in step S409, the CPU 103 determines whether linked setup processing can be continued.

As the determination in step S409, it is determined whether the display data determined in step S405 not to be normally displayed is display data essential for continuing the linked setup processing. Essential display data is display data concerning the display of the description of the main body installation operation. If it is determined in step S405 that the display data is not normally displayed, in step S409, the CPU 103 determines that the linked setup processing cannot be continued, and advances to step S410. On the other hand, data that allows the user to execute the main body installation operation in linked setup processing even if normal display is not performed due to garbled characters or the like, for example, a wait screen representing that processing is waiting or an error screen, is not handled as essential display data. If it is determined, in step S405 for such display data, that normal display is not performed, in step S409, the CPU 103 determines that linked setup processing can be continued, and advances to step S406. However, in step S409, all display data including a wait screen and an error screen as described above may be handled as essential display data. That is, if it is determined in step S405 that normal display is not performed for any one of the display data included in the downloaded linked setup data, it may be determined that linked setup processing cannot be continued.

After step S406, the CPU 103 waits in step S407 until the state of the printing apparatus 151 changes. In step S407, for example, the CPU 103 transmits a state acquisition request to the printing apparatus 151 at a predetermined time interval, determines, based on the received state information of the printing apparatus 151, whether the state of the printing apparatus 151 has changed, and waits until it is determined that the state of the printing apparatus 151 has changed. Note that the printing apparatus 151 internally updates the state information of the printing apparatus 151 along with the progress of the main body installation operation by the user.

In step S408, the CPU 103 determines, based on the received state information of the printing apparatus 151, whether the main body installation operation by the user is completed. Upon determining that the main body installation operation is completed, the processing shown in FIG. 4 is ended. On the other hand, upon determining that the main body installation operation is not completed, the CPU 103 repeats the processing from step S405. Accordingly, for example, if the moving image for describing the ink tank attaching method is displayed in preceding step S406, a moving image for describing the next step of the main body installation operation is displayed in next step S406.

Upon determining in step S401 that the printing apparatus 151 does not support linked setup processing, the processing of step S410 is executed. Also, upon determining in step S403 that an error has occurred in download or upon determining in step S409 that linked setup processing cannot be continued, the processing of step S410 is executed. A case in which the processing of step S410 is executed from step S403 or S409 corresponds to, for example, a case in which download of linked setup data from the server has failed because of the data size or the like. This also corresponds to a case in which contents are lost even if download of linked setup data has succeeded or a case in which parsing processing has failed.

In step S410, the CPU 103 stores, in an internal storage area, the identification information of the printing apparatus 151 that is the current target of linked setup processing and information representing the progress state of linked setup processing. Here, the identification information of the printing apparatus 151 includes, for example, a model name, a serial number, an IP address, and information representing whether setup paper is packaged together. Note that the setup paper is a paper medium in which the main body installation operation is described. Also, the information representing the progress state of linked setup processing is, for example, information representing the current state of the printing apparatus 151 (for example, a state in which only the black ink tank is attached) or information input or selected by the user up to the present time (for example, the use language or region information). A case in which the processing of step S410 is executed from step S401 is a case in in which the printing apparatus 151 is of a model that does not support linked setup processing. In this case, the CPU 103 skips display of the progress state of linked setup processing and stores information representing the progress state up to processing before the processing of displaying the description of the main body installation operation (for example, information representing that network setting is completed).

In step S411, based on the information stored in step S410, the CPU 103 acquires, from the setup application, access destination information (for example, URL information) of a web page that displays the description of the main body installation operation. For example, assume that the main body installation operation is performed in the order of "removal of fixing tape", "attachment of ink tanks", and "setting of paper sheet in cassette". For example, if the state of the printing apparatus 151 stored in step S410 is "attachment of ink tanks", this indicates that the linked setup processing is interrupted in the step of ink tank attachment. In this case, since "removal of fixing tape" is already ended, access destination information of a web page that displays the description of ink tank attachment corresponding to the model of the printing apparatus 151 is acquired. At this time, the CPU 103 may transmit, for example, the information stored in step S410 to the server for providing the setup application and acquire the access destination information of the web page from the server. In step S411, the CPU 103 displays a guidance screen configured to display the information representing the web page as a guidance destination by the display unit 108 based on the acquired access destination information.

Figure 3:
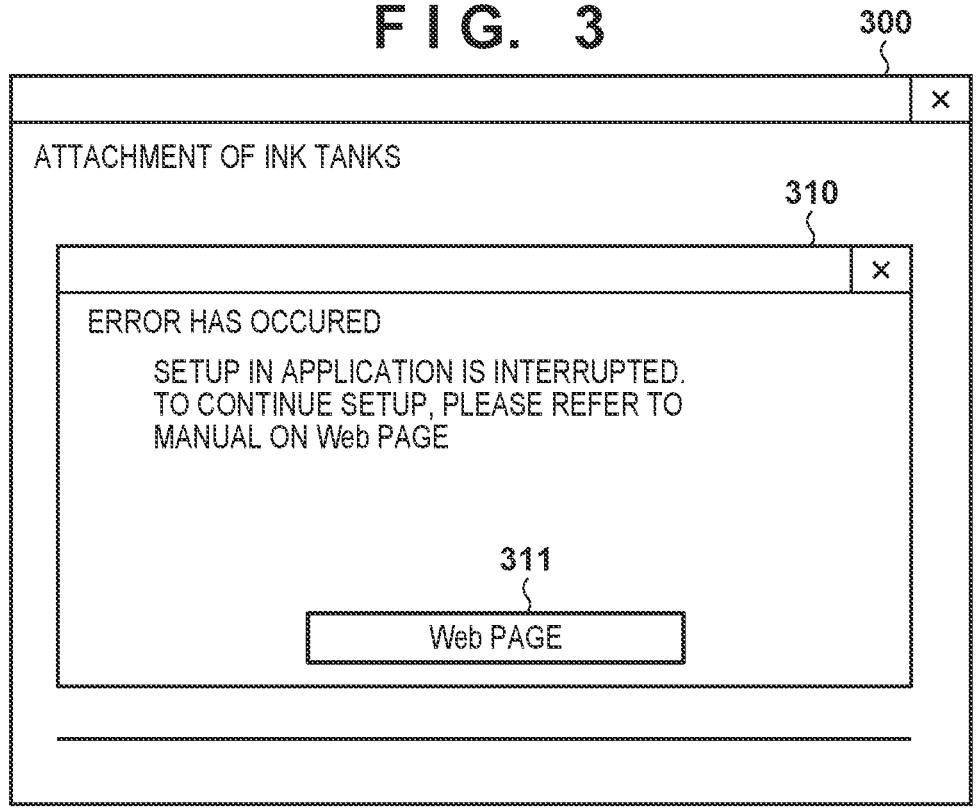
FIG. 3 is a view showing a guidance screen displayed in step S411.

FIG. 3 is a view showing an example of a guidance screen displayed in step S411. FIG. 3 shows a state in which a guidance screen 310 is displayed in a superimposed manner on a screen 300 of the setup application displayed on the information processing apparatus 101. A description of a setup method such as an ink tank attaching method is displayed on the screen 300, although not illustrated because of superimposition. A message indicating that an interruption has occurred in the ink tank attaching process of the main body installation operation is displayed on the guidance screen 310. A message configured to guide the user to access a web page and a button 311 are displayed on the guidance screen 310. When the button 311 is pressed by the user, the CPU 103 closes the guidance screen 310, accesses, using the access destination information, the server for providing the setup application, and displays a web page that displays the description of the main body installation operation on the display unit 108 by a web browser. Note that in this embodiment, it is assumed that the web page displayed at this time is a web page that displays the description of the main body installation operation from the beginning by a predetermined screen independently of the current state of the printing apparatus 151. However, the present invention is not limited to this form, and a web page that displays the description of the main body installation operation according to the current state of the printing apparatus 151 may be displayed, like linked setup. In this case, the CPU 103 acquires access destination information according to the current state of the printing apparatus 151, and displays the guidance screen 310 based on the access destination information. After step S411, the processing shown in FIG. 4 is ended.

In step S411, the CPU 103 may acquire the web page that displays the description of the main body installation operation from the server without displaying the guidance screen 310, and display the web page on the web browser. In FIG. 3, the guidance screen 310 is displayed on the setup application screen 300. If it is determined in step S401 that the printing apparatus 151 does not support linked setup processing, or if it is determined in step S403 that an error has occurred in download, the setup application screen 300 by linked setup data is not displayed. Hence, in this case, for example, the guidance screen 310 may displayed solely or on the screen of another application displayed immediately before. Note that in any display method, the guidance screen 310 is a screen displayed by the setup application without using a web browser. Note that in step S411, the setup application displays the screen used to access the web page, as described above. However, the present invention is not limited to this form. For example, the setup application may display the screen that displays the description of the main body installation operation from the beginning by a predetermined screen independently of the current state of the printing apparatus 151 directly without using a web browser. Note that in this form, the information used to display the screen may be held in advance by the setup application, or may be acquired by the setup application from the server.

As described above, according to this embodiment, even if linked setup data cannot be prepared in the information processing apparatus 101, it is possible to guide the user to access a web page configured to display the description of the main body installation operation. As a result, the user can continuously perform the main body installation operation.

Second Embodiment

The second embodiment will be described concerning points different from the first embodiment. In the first embodiment, the configuration that guides the user to access the web page configured to display the description of the main body installation operation has been described. In the second embodiment, an operation to be performed in a case in which not only the web page but also a plurality of media capable of presenting the main body installation operation exist as the guidance destinations will be described. In this embodiment, not only the web page but also a display unit 161 mounted on a printing apparatus 151 and setup paper packaged together with the printing apparatus 151 can be guidance destination media capable of presenting the main body installation operation.

FIG. 6 is a flowchart showing processing of display control of a guidance screen according to this embodiment. Processing shown in FIG. 6 is executed in step S411 of FIG. 4. In step S601, a CPU 103 determines whether the display unit 161 capable of displaying the description of the main body installation operation is mounted on the printing apparatus 151. For example, the CPU 103 may acquire configuration information from the printing apparatus 151, and determine the presence/absence of the display unit 161. Upon determining that the display unit 161 is mounted on the printing apparatus 151, in step S604, the CPU 103 displays, on a display unit 108, a guidance screen that guides the user to refer to the display unit 161 of the printing apparatus 151.

Figure 5A:
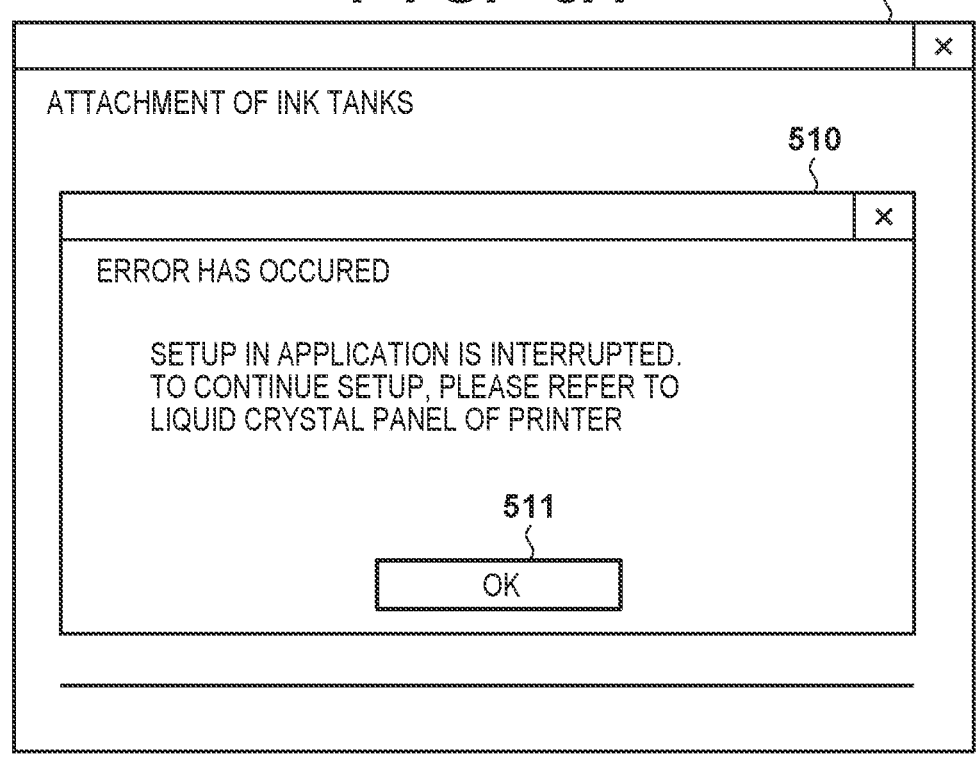
FIGS. 5A and 5B are views showing a guidance screen displayed in step S411.

FIG. 5A is a view showing an example of a guidance screen 510 displayed on a setup application screen 500 to guide the user to refer to the display unit 161 of the printing apparatus 151. As shown in FIG. 5A, the guidance screen 510 is provided with an OK button 511. If the OK button 511 is pressed by the user, the CPU 103 closes the guidance screen 510, and after that, ends the processes shown in FIGS. 6 and 4. If the OK button 511 is pressed, the CPU 103 requests the printing apparatus 151 to display a guidance screen showing the main body installation operation corresponding to the current state of the printing apparatus 151. Upon receiving the request from an information processing apparatus 101, a CPU 154 of the printing apparatus 151 displays, on the display unit 161, a guidance screen showing the main body installation operation corresponding to the current state of the printing apparatus 151. Note that the data of the guidance screen displayed on the display unit 161 of the printing apparatus 151 is simple data held in advance in the printing apparatus 151 such that the display unit 161 can display it, and the data size is smaller than that of display data included in linked setup data.

Upon determining in step S601 that the display unit 161 is not mounted on the printing apparatus 151, in step S602, the CPU 103 determines whether the information processing apparatus 101 can be connected to a server that provides the setup application. For example, the CPU 103 determines whether the information processing apparatus 101 is connected to the Internet. Upon determining that connection to the server is possible, the CPU 103 displays a guidance screen 310 shown in FIG. 3 on the display unit 108. If a button 311 is pressed by the user, the CPU 103 closes the guidance screen 310, accesses the server that provides the setup application, and displays, on the display unit 108, a web page that displays the description of the main body installation operation. After that, the processes shown in FIGS. 6 and 4 are ended.

Upon determining in step S602 that connection to the server is impossible, in step S603, the CPU 103 determines, based on the information of the printing apparatus 151 stored in step S410, whether the printing apparatus 151 is a model for which the setup paper is packaged together. As the determination criterion in step S603, information representing whether the printing apparatus 151 is a model for which the setup paper is packaged together may be included as the identification information of the printing apparatus 151. Alternatively, in step S603, the CPU 103 may determine, based on the model name of the printing apparatus 151, whether the printing apparatus 151 is a model for which the setup paper is packaged together. In this case, data that associates the model name of the printing apparatus 151 with the information representing whether the setup paper is packaged together may be included in the setup application. Upon determining in step S603 that the printing apparatus 151 is a model for which the setup paper is packaged together, in step S606, the CPU 103 displays, on the display unit 108, a guidance screen 520 that guides the user to refer to the setup paper.

Figure 5B:
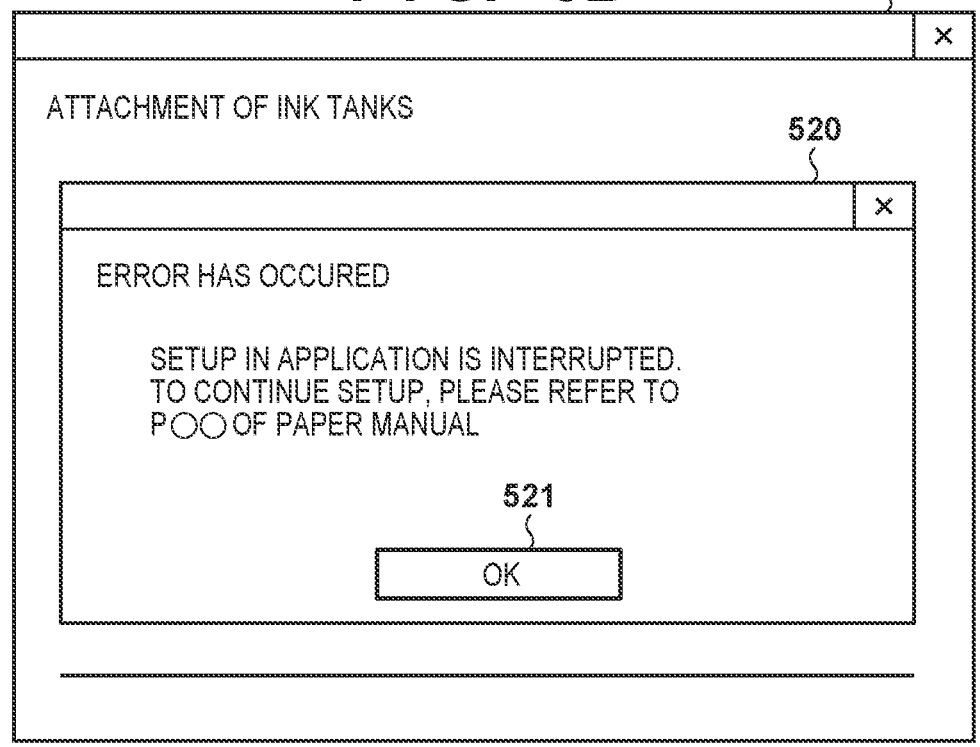

FIG. 5B is a view showing an example of the guidance screen 520 displayed on the setup application screen 500 to guide the user to refer to the setup paper packaged together with the printing apparatus 151. As shown in FIG. 5B, on the guidance screen 520, a page number where the procedure of the main body installation operation interrupted in linked setup processing is described is displayed based on information representing the progress state of the linked setup processing stored in step S410. The guidance screen 520 is provided with an OK button 521. If the OK button 521 is pressed by the user, the CPU 103 closes the guidance screen 520 and ends the processes shown in FIGS. 6 and 4.

Upon determining in step S603 that the printing apparatus 151 is not a model for which the setup paper is packaged together, in step S607, the CPU 103 displays, on the display unit 108, a message screen showing that the linked setup processing is interrupted. After that, the processes shown in FIGS. 6 and 4 are ended. In step S607, a message for promoting access to the home page of the maker of the printing apparatus 151 or confirmation of the communication state of the information processing apparatus 101 may be displayed.

Referring to FIG. 6, the guidance screen that guides the user to refer to the display unit 161 of the printing apparatus 151 is preferentially displayed. The printing apparatus 151 can automatically display the guidance screen in linkage with the internal state of itself. For this reason, a main body installation operation continuing method that simplifies the user operation can preferentially be displayed. In addition, the priority order of the web page is set higher than the setup paper because the web page can easily be updated, unlike the setup paper, and transition from the setup application screen is easy.

In FIG. 6, the order of priority of the guidance destinations is set in the order of the display unit 161 of the printing apparatus 151, the web page, and the setup paper. However, the order is not limited to this, and the priority order may be changeable. For example, the description of the main body installation operation may be difficult to read depending on the panel size of the display unit 161 of the printing apparatus 151. For example, if the CPU 103 determines, based on the configuration information of the printing apparatus 151, that the panel size of the display unit 161 of the printing apparatus 151 is equal to or less than a predetermined value, the priority order may be changed to the order of the web page, the setup paper, and the display unit 161 of the printing apparatus 151.

As described above, in this embodiment, if a plurality of media capable of presenting the main body installation operation exist as the guidance destinations, an appropriate guidance destination can be presented to the user based on the communication state of the information processing apparatus 101 and the configuration information of the printing apparatus 151.

Third Embodiment

The third embodiment will be described concerning points different from the first and second embodiments. In the second embodiment, a configuration has been described, which presents an appropriate guidance destination to the user based on the communication state of an information processing apparatus 101 and the configuration information of a printing apparatus 151 if a plurality of media capable of presenting the main body installation operation exist as the guidance destinations. In this embodiment, if a plurality of media capable of presenting the main body installation operation exist, these are presented to the user as selectable guidance destinations. In this embodiment, the user can select a desired medium by the configuration.

FIG. 8 is a flowchart showing processing of display control of a guidance screen according to this embodiment. Processing shown in FIG. 8 is executed in step S411 of FIG. 4. In step S801, a CPU 103 determines whether a display unit 161 capable of displaying the description of the main body installation operation is mounted on the printing apparatus 151. For example, the CPU 103 may acquire configuration information from the printing apparatus 151, and determine the presence/absence of the display unit 161. Upon determining that the display unit 161 is mounted on the printing apparatus 151, in step S802, the CPU 103 sets the display unit 161 of the printing apparatus 151 as the guidance destination media for the user, and advances to step S803. On the other hand, upon determining that the display unit 161 is not mounted on the printing apparatus 151, the process advances to step S803.

In step S803, the CPU 103 determines whether the information processing apparatus 101 can be connected to a server that provides the setup application. For example, the CPU 103 determines whether the information processing apparatus 101 is connected to the Internet. Upon determining that connection to the server is possible, in step S804, the CPU 103 sets the web page that displays the description of the main body installation operation as the guidance destination media for the user, and advances to step S805. On the other hand, upon determining that connection to the server is impossible, the process advances to step S805.

In step S805, the CPU 103 determines, based on the information of the printing apparatus 151 stored in step S410, whether the printing apparatus 151 is a model for which the setup paper is packaged together. As the determination criterion in step S805, information representing whether the printing apparatus 151 is a model for which the setup paper is packaged together may be included as the identification information of the printing apparatus 151. Alternatively, in step S805, the CPU 103 may determine, based on the model name of the printing apparatus 151, whether the printing apparatus 151 is a model for which the setup paper is packaged together. In this case, data that associates the model name of the printing apparatus 151 with the information representing whether the setup paper is packaged together may be included in the setup application. Upon determining in step S805 that the printing apparatus 151 is a model for which the setup paper is packaged together, in step S806, the CPU 103 sets the setup paper as the guidance destination media for the user, and advances to step S807. On the other hand, upon determining that the printing apparatus 151 is not a model for which the setup paper is packaged together, the process advances to step S807.

In step S807, the CPU 103 determines whether one guidance destination medium is set, or a plurality of guidance destination media are set. Upon determining that a plurality of guidance destination media are set, in step S808, the CPU 103 displays a guidance screen configured to allow the user to select each of the plurality of set guidance destination media.

Figure 7A:
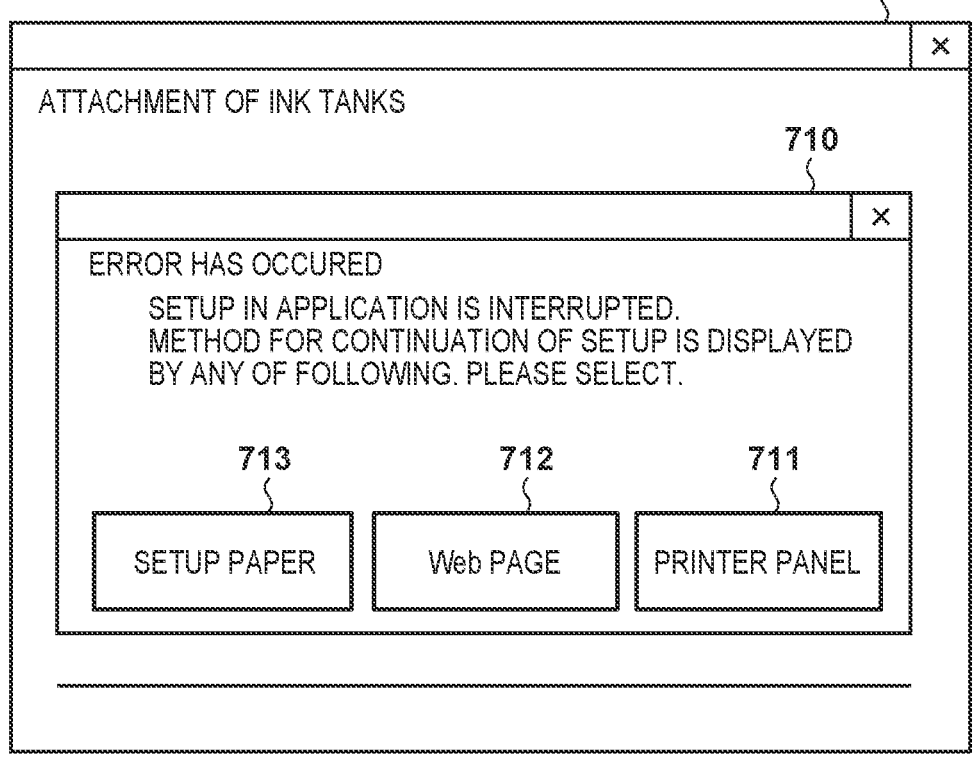
FIGS. 7A and 7B are views showing a guidance screen displayed in step S411.

FIG. 7A is a view showing an example of a guidance screen 710 displayed in step S808. FIG. 7A shows the guidance screen 710 displayed on a setup application screen 700 that describes the main body installation operation such as an ink tank attaching method and configured to allow the user to select each of a plurality of guidance destination media. On the guidance screen 710, a message for promoting the user to select one of the guidance destination media and buttons 711 to 713 indicating the plurality of guidance destination media are displayed. The button 711 displays information representing the display unit 161 of the printing apparatus 151 as a guidance destination. The button 712 displays information representing a web page as a guidance destination. The button 713 displays information representing setup paper as a guidance destination. If the button 711 is pressed, the CPU 103 displays a guidance screen 510 shown in FIG. 5A on a display unit 108. If the button 712 is pressed, the CPU 103 displays a guidance screen 310 shown in FIG. 3 on the display unit 108. If the button 712 is pressed, instead of displaying the guidance screen 310, the CPU 103 may acquire the web page from the server and display the web page that displays the description of the main body installation operation. If the button 713 is pressed, the CPU 103 displays a guidance screen 520 shown in FIG. 5B on the display unit 108. After step S808, the processes shown in FIGS. 8 and 4 are ended.

Figure 7B:
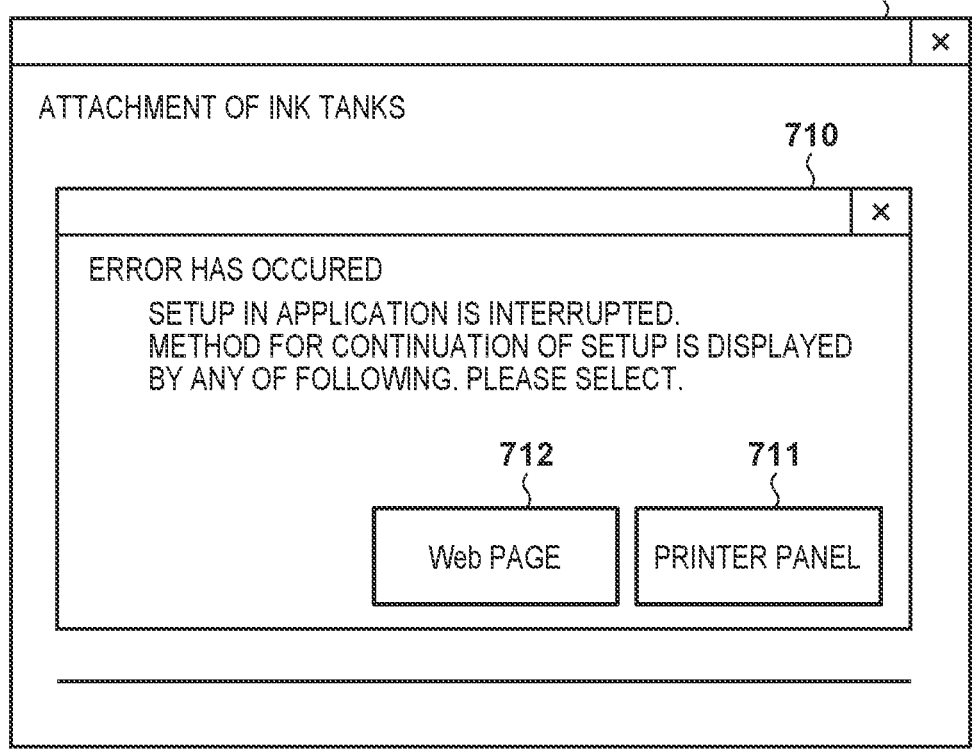

FIG. 7B shows an example of the guidance screen 710 displayed in a case in which one of the processes of steps S802, S804, and S806 is not executed. For example, the guidance screen 710 is a guidance screen displayed in a case in which the display unit 161 of the printing apparatus 151 and the web page that displays the description of the main body installation operation are set as the guidance destination media, and the setup paper is not set as the guidance destination medium. As shown in FIG. 7B, since the medium that the user cannot refer to is not displayed, the user can easily recognize the referable guidance destination media.

Upon determining in step S807 that one guidance destination medium is set, in step S809, the CPU 103 displays, on the display unit 108, a guidance screen showing the information of the set guidance destination medium. For example, if the display unit 161 of the printing apparatus 151 is set as the guidance destination medium, the guidance screen 510 shown in FIG. 5A is displayed. Also, for example, if the web page is set as the guidance destination medium, the guidance screen 310 shown in FIG. 3 is displayed. Alternatively, for example, if the setup paper is set as the guidance destination medium, the guidance screen 520 shown in FIG. 5B is displayed. After step S809, the processes shown in FIGS. 8 and 4 are ended.

As described above, according to this embodiment, if a plurality of media capable of presenting the main body installation operation exist, these are presented to the user as selectable guidance destinations. The user can select a desired medium by the configuration.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-073657, filed Apr. 23, 2021, which is hereby incorporated by reference herein in its entirety.

What is claimed is:

1. A control method of an information processing apparatus comprising:
   performing setup processing of a first apparatus connected to the information processing apparatus;
   acquiring setup data used in the setup processing and indicating a setup operation of the first apparatus from a second apparatus that is a server different from the first apparatus;
   based on a fact that the setup data is acquired from the second apparatus because no error occurred during acquisition of the setup data from the second apparatus performing, by using the setup data, display concerning the setup operation by a predetermined program, and
   based on a fact that an error occurs during acquisition of the setup data from the second apparatus, performing predetermined processing for allowing a user to refer to other medium except for the predetermined program, the other medium being for presenting information concerning the setup operation.

2. The method according to claim 1, further comprising analyzing the acquired setup data,
   wherein based on a fact that the setup data is acquired from the second apparatus and a result of the analyzing is a first result, the display concerning the setup operation by the predetermined program is performed, and
   based on a fact that the setup data is acquired from the second apparatus and a result of the analyzing is a second result, the predetermined processing is performed.

3. The method according to claim 2, wherein the analysis is parsing processing.

4. The method according to claim 1, wherein based on a fact that the setup data is acquired from the second apparatus and a content of a display target of the setup operation is absent, the display concerning the setup operation by the predetermined program is performed, and
   based on a fact that the setup data is acquired from the second apparatus and a content of a display target of the setup operation is present, the predetermined processing is performed.

5. The method according to claim 4, wherein the content is at least one of a text, an image, and a moving image.

6. The method according to claim 1, wherein
   the setup operation includes a plurality of steps,
   the method further comprises acquiring state information of the first apparatus along with progress of the plurality of steps,
   wherein the display concerning the setup operation is performed by the predetermined program based on the state information.

7. The method according to claim 1, wherein the other medium is a web page for presenting the information concerning the setup operation, and the predetermined processing is processing for allowing the user to refer to the web page.

8. The method according to claim 1, wherein the other medium is a display unit of the first apparatus for presenting the information concerning the setup operation, and the predetermined processing is processing for allowing the user to refer to the display unit of the first apparatus.

9. The method according to claim 1, wherein the other medium is a paper medium which is for presenting the information concerning the setup operation and is packed together with the first apparatus, and the predetermined processing is processing for allowing the user to refer to the paper medium.

10. The method according to claim 1, wherein pieces of information of a plurality of media presenting the setup operation are displayed,
wherein the pieces of information of the plurality of media are displayed such that each information can be selected.

11. The method according to claim 10, wherein the pieces of information of the plurality of media are displayed based on a state of connection to the second apparatus and configuration information of the first apparatus.

12. The method according to claim 11, wherein the configuration information of the first apparatus is information representing presence/absence of a display unit.

13. The method according to claim 10, wherein information of at least one of a web page provided by the second apparatus, a display unit of the first apparatus, and a paper medium packaged together with the first apparatus is displayed as the pieces of information of the plurality of media.

14. The method according to claim 1, wherein the first apparatus is a printing apparatus.

15. The method according to claim 1, wherein the setup data is downloaded from the server via a network.

16. The method according to claim 1, wherein the other medium is a web page and the predetermined processing is processing of displaying, by the predetermined program, a screen including a button for displaying the other medium.

17. The method according to claim 1, wherein the setup operation includes at least one of stripping off a packing tape from the first apparatus, detaching a fixing member from the first apparatus, and attaching an ink tank on the first apparatus.

18. The method according to claim 1, wherein the setup operation includes a plurality of steps,
the method further comprises acquiring state information of the first apparatus along with progress of the plurality of steps,
the predetermined processing is performed based on the state information.

19. An information processing apparatus comprising:
at least one processor; and
at least one memory storing instructions that, when executed by the at least one processor, cause the at least one processor to function as
a setup unit configured to perform setup processing of a first apparatus connected to the information processing apparatus;
an acquisition unit configured to acquire setup data used in the setup processing and indicating a setup operation of the first apparatus from a second apparatus that is a server different from the first apparatus;
based on a fact that the setup data is acquired from the second apparatus because no error occurred during acquisition of the setup data from the second apparatus, performing, by using the setup data, display concerning the setup operation by a predetermined program,
based on a fact that an error occurs during acquisition of the setup data from the second apparatus, performing predetermined processing for allowing a user to refer to other medium except for the predetermined program, the other medium being for presenting information concerning the setup operation.

20. A non-transitory computer-readable storage medium storing a program configured to cause a computer to function to:
perform setup processing of a first apparatus connected to the information processing apparatus;
acquire setup data used in the setup processing and indicating a setup operation of the first apparatus from a second apparatus that is a server different from the first apparatus;
based on a fact that the setup data is acquired from the second apparatus because no error occurred during acquisition of the setup data from the second apparatus, perform, by using the setup data, display concerning the setup operation by a predetermined program,
based on a fact that an error occurs during acquisition of the setup data from the second apparatus, perform predetermined processing for allowing a user to refer to other medium except for the predetermined program, the other medium being for presenting information concerning the setup operation.

* * * * *